United States Patent
Wigren

(10) Patent No.: US 7,953,025 B2
(45) Date of Patent: May 31, 2011

(54) LOAD ESTIMATION USING SCHEDULED UPLINK POWER

(75) Inventor: Karl Torbjörn Wigren, Uppsala (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 154 days.

(21) Appl. No.: 12/525,939

(22) PCT Filed: Feb. 5, 2007

(86) PCT No.: PCT/SE2007/050066
§ 371 (c)(1),
(2), (4) Date: Aug. 5, 2009

(87) PCT Pub. No.: WO2008/097145
PCT Pub. Date: Aug. 14, 2008

(65) Prior Publication Data
US 2010/0315947 A1    Dec. 16, 2010

(51) Int. Cl.
*G01R 31/08* (2006.01)
*H04B 7/185* (2006.01)
*H04B 7/216* (2006.01)
*H04B 7/00* (2006.01)

(52) U.S. Cl. ......... 370/252; 370/318; 370/320; 455/522

(58) Field of Classification Search .................. 370/230, 370/252, 254, 255, 317, 318, 320, 332, 333, 370/334, 335, 342, 441; 455/63.11, 67.11, 455/67.13, 114.2, 226.2, 278.1, 283, 296, 423, 522

See application file for complete search history.

(56) References Cited

U.S. PATENT DOCUMENTS

| 6,671,512 | B2 * | 12/2003 | Laakso | 455/453 |
| 7,738,412 | B2 * | 6/2010 | Hamalainen et al. | 370/318 |
| 2002/0115459 | A1 * | 8/2002 | Chuang et al. | 455/522 |
| 2009/0262658 | A1 * | 10/2009 | Kondo | 370/252 |
| 2011/0021239 | A1 * | 1/2011 | Wakabayashi et al. | 455/522 |

* cited by examiner

*Primary Examiner* — Kwang B Yao
*Assistant Examiner* — Tung Q Tran

(57) ABSTRACT

A method for providing load reference data in a CDMA system comprises measuring of received total wideband power and of received scheduled enhanced uplink power. State variables are selected corresponding to cell power quantities and measurement functions are selected corresponding to the measured received total wideband power and the measured received scheduled enhanced uplink power. A probability distribution for a first power quantity—related to the selected state variables—is estimated. A conditional probability distribution of a noise floor measure is computed based on the estimated probability distribution for the first power quantity. Load reference data is provided based on the computed conditional probability distribution of the noise floor measure. In a preferred embodiment, the first power quantity is a measure of the difference between received total wideband power and received scheduled enhanced uplink power. The load reference data can be used in e.g. enhanced uplink scheduling or admission control.

22 Claims, 7 Drawing Sheets

LOAD ESTIMATION USING SCHEDULED UPLINK POWER

TECHNICAL FIELD

The present invention relates in general to methods and devices for load estimation in cellular communication systems.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink traffic. It is well known that existing users of the cell all contribute to the interference level in the uplink of WCDMA systems. Further, terminals in neighbour cells also contribute to the same interference level. This is because all users and common channels of a cell transmit in the same frequency band when Code Division Multiple Access (CDMA) technology is used. The load of the cell is directly related to the interference level of the same cell.

In order to retain stability of a cell, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements. This SIR level is normally such that the received powers in the radio base station (RBS) are several dBs below the interference level. De-spreading in so called RAKE-receivers then enhance each channel to a signal level where the transmitted bits can be further processed, e.g. by channel decoders and speech codecs that are located later in the signal processing chain.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (E-UL) channel in WCDMA, so that one can insure that instability is avoided. In order to do so, the momentary load must be estimated in the RBS or any node connected thereto. This enables the assessment of the capacity margin that is left to the instability point.

The load of a cell in e.g. a CDMA system is usually referred to some quantity related to power, typically noise rise or the rise over thermal (RoT). Power quantities, such as total power level and noise floor (ideally thermal noise), have to be determined. Determinations of highly fluctuating power quantities or noise floor according to prior art is typically associated with relatively large uncertainties, which even may be in the same order of magnitude as the entire available capacity margin. It will thus be very difficult indeed to implement enhanced uplink channel functionality without improving the load estimation connected thereto.

A number of noise rise measures do exist. The most important one is perhaps the Rise over Thermal (RoT) that is defined as the quotient of the total interference of the cell and the thermal noise power floor of the receiver of the RBS. Other measures include e.g. in-band non-WCDMA interference with respect to the thermal noise floor.

At this point it could be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the pathloss to the digital receiver. Since the pathloss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the pathloss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the load below a specific level. This means that load estimation is important also for coverage. In particular load estimation is important from a coverage point of view in the fast scheduling of enhanced uplink traffic in the RBS. Furthermore, the admission control and congestion control functionality in the radio network controller (RNC) that controls a number of RBS's also benefits from accurate information on the momentary noise rise of the cell.

One approach to improve load estimation is disclosed in the published international patent application WO 2006/076969 [1]. A minimum value of a power quantity, preferably a difference between the instantaneous total received wideband power and the instantaneous sum of powers of all links used in the same cell, is used as an estimate of an upper limit of the thermal noise floor. However, the estimation principle does not account for prior information that may be available on e.g. the probability distribution of the true thermal noise floor power, over a collection of RBS's. Moreover, the estimate of the thermal noise power floor obtained by the above ideas is always biased to be higher than the true value. This follows since the sum of thermal noise floor power, neighbour cell WCDMA power and non-WCDMA in-band interference power is always at least as great as the thermal noise power floor only. Hence, when the minimum is estimated over a determined interval of time, a value larger than the true thermal noise power is always obtained. A consequence of this is that the noise rise is always underestimated, i.e. the load of the cell is underestimated. The consequence could be too aggressive scheduling, leading e.g. to cell instability.

Admission control makes sure that the number of users in a cell does not become larger than what can be handled, in terms of hardware resources and in terms of load. A too high load first manifests itself in too poor quality of service, a fact that is handled by the outer power control loop by an increase of the SIR target. In principle this feedback loop may also introduce power rushes, as described in the previous section.

The admission control function can prevent both the above effects by regulation of the number of users and corresponding types of traffic that is allowed for each cell controlled by the RNC.

In order to regulate the number of users the RNC needs to have means for computation of a measure of the load of a cell. This measure of the load of the cell is then compared to a threshold, and new users are accepted if the load of the cell is predicted to remain below the threshold, after the tentative addition of the new user. An improved load measure for the admission control function is requested, so that a higher number of users can be accepted, without sacrificing cell stability limits.

In order to provide a good estimate of the thermal noise power floor, the preferred power difference should be considered. However, this requires collection and reporting of a multitude of link power measurements, which makes the method practically impossible to perform in a node different from the RBS.

SUMMARY

A general object of the present invention is to provide improved methods and arrangements for load estimation. A further object of the present invention is to provide methods and arrangements giving more accurate determination of noise floor. Yet a further object of the present invention is to provide methods and arrangements for facilitating load estimation to be performed at various kinds of communication network nodes.

The above objects are achieved by methods, devices and systems according to the enclosed patent claims. In general words, in a first aspect, a method for providing load reference data in a CDMA wireless communication system, comprises measuring of received total wideband power and measuring of received scheduled enhanced uplink power for a plurality of instances. State variables corresponding to cell power quantities are selected and measurement functions of the state variables corresponding to the measured received total wideband power and the measured received scheduled enhanced uplink power are selected. A probability distribution for a first power quantity, which is related to the selected state variables, is estimated from quantities representing the measured received total wideband power and quantities representing the measured received scheduled enhanced uplink power using the selected measurement functions. A conditional probability distribution of a noise floor measure is computed based on at least the estimated probability distribution for the first power quantity. Load reference data is provided based on the computed conditional probability distribution of the noise floor measure. In a preferred embodiment, the first power quantity is a difference measure of the difference between received total wideband power and received scheduled enhanced uplink power.

According to a second aspect, a method for enhanced uplink scheduling in a CDMA wireless communication system, comprises provision of load reference data according to the first aspect and scheduling of enhanced uplink traffic based on the provided load reference data.

According to a third aspect, a method for admission control in a CDMA wireless communication system, comprises provision of load reference data according to the first aspect and controlling of admission based on the provided load reference data.

According to a fourth aspect, a node of a CDMA wireless communications system comprises means for obtaining quantities representing measures of received total wideband power for a plurality of instances and means for obtaining quantities representing measures of received scheduled enhanced uplink power for the plurality of instances. The node further comprises means for estimating a probability distribution for a first power quantity from the quantities representing the measured received total wideband power and the quantities representing the measured received scheduled enhanced uplink power. The means for estimating is connected to the means for obtaining quantities representing measures of received total wideband power and the means for obtaining quantities representing measures of received scheduled enhanced uplink power. The means for estimating is arranged to operate with selected state variables corresponding to cell power quantities and with selected measurement functions of the state variables corresponding to the measured received total wideband power and the measured received scheduled enhanced uplink power. The first power quantity is related to the selected state variables, whereby the means for estimating is arranged for estimating the probability distribution for the first power quantity using the selected measurement functions.

According to a fifth aspect, a CDMA wireless communication system comprises at least one node according to the fourth aspect.

One advantage with the present invention is that it enables accurate load estimation, which practically can be performed in various nodes of a CDMA wireless communication system. Any risk for an artificially high noise floor in highly loaded cells is furthermore removed.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
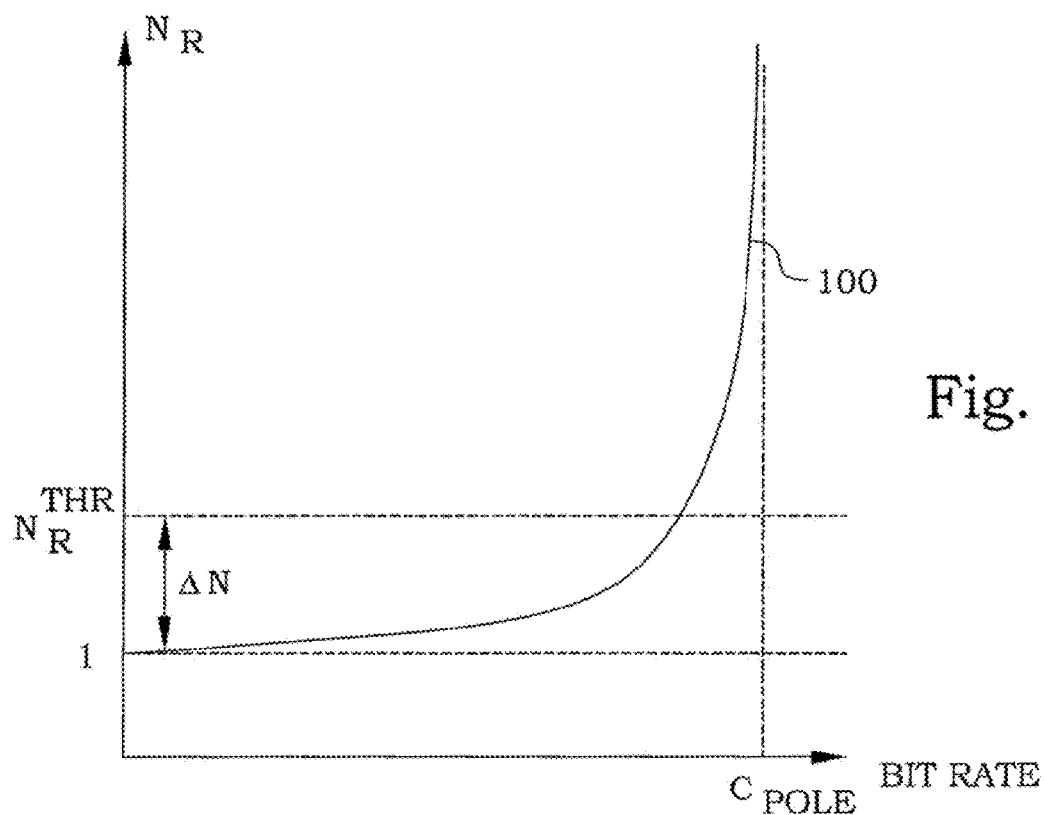
FIG. 1 illustrates a typical relation between noise rise and total bitrate in a cell.

Throughout the entire disclosure, bold letters in equations refer to vector or matrix quantities.

In the drawings, corresponding reference numbers are used for similar or corresponding parts.

The present detailed description benefits from a somewhat deeper understanding about how to perform load estimation and the problems connected thereto. Descriptions about reference and measurement points, power measurements, power control loops, noise rise, observability of noise floor, and noise rise estimations are found in WO 2006/076969 and are in a general sense also applicable to the present disclosure.

FIG. 1 is a diagram illustrating conditions concerning load estimation. Noise rise $N_R$, defined as the ratio between a total power and the thermal noise level $P_N$ as measured at the antenna connector, also referred to as the noise floor, is a measure of the load. Above a noise rise threshold $N_R^{thr}$, the situation becomes unstable. A relation 100 between total bit rate and noise rise $N_R$ is known from the design of the control loops, and scheduling of additional channels can be performed once the instantaneous noise rise $N_R$ has been determined. The pole capacity, $C_{pole}$, denotes the maximum bitrate capacity in bits per second. A typical difference $\Delta N$ between the threshold $N_R^{thr}$ and the level defined by the thermal noise level $P_N$ is typically 7 dB. However, the noise floor or thermal noise level $P_N$ is normally not available with sufficient accuracy.

Figure 2:
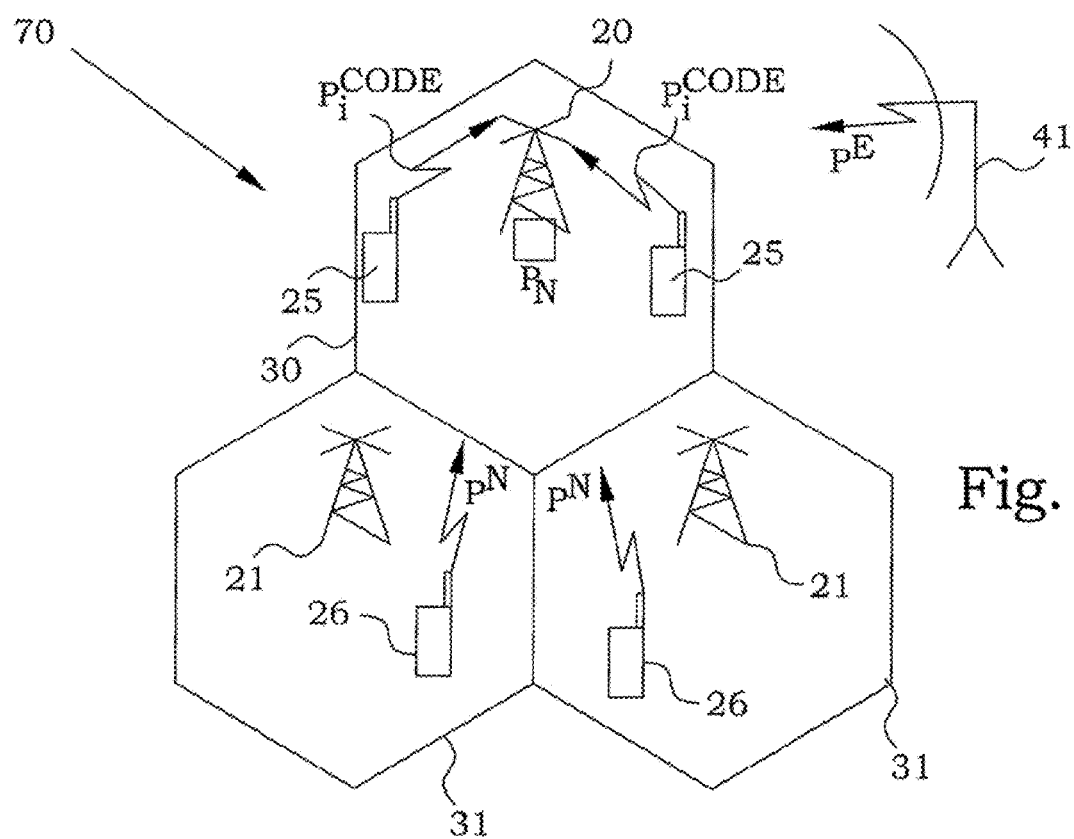
FIG. 2 is a schematic illustration of signal powers occurring in a typical mobile communications network.

FIG. 2 illustrates the contributions to power measurements in connection with an RBS 20. The RBS 20 is associated with a cell 30. Within the cell 30, a number of mobile terminals 25 are present, which communicate with the RBS 20 over different links, each contributing to the total received power by $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, the $P_N$ term, denoting the noise floor power, arises from the receiver itself.

A total wide band power measurement $P_{Measurement}^{RTWP}(t)$ can be expressed by:

$$P_{Measurement}^{Total}(t) = \sum_{i=1}^{n} P_i^{Code}(t) + P^{E+N}(t) + P_N(t) + e^{Total}(t), \quad (1)$$

where $$P^{E+N} = P^E + P^N, \quad (2)$$

and where $e^{RTWP}(t)$ models measurement noise.

It can be mathematically proved that a linear estimation of $P^{E+N}(t)$ and $P_N$ is not an observable problem. Only the sum $P^{E+N}+P_N$ is observable from the available measurements.

The principle used in WO 2006/076969 for estimation of the thermal noise power floor is to estimate it as a minimum of a measured or estimated power quantity. The power in question is preferably either the sum of the power of the noise floor and the power of neighbour and external interference, or the total received wideband power. The estimate of the thermal noise power floor obtained by the above ideas is always biased to be higher than the true value. This follows since the sum of thermal noise floor power, neighbour cell WCDMA power and non-WCDMA in-band interference power is always at least as great as the thermal noise power floor itself. A consequence of this is that the noise rise is underestimated, i.e. the load of the cell is underestimated. The consequence could be too aggressive scheduling, leading e.g. to cell instability.

Figure 3:
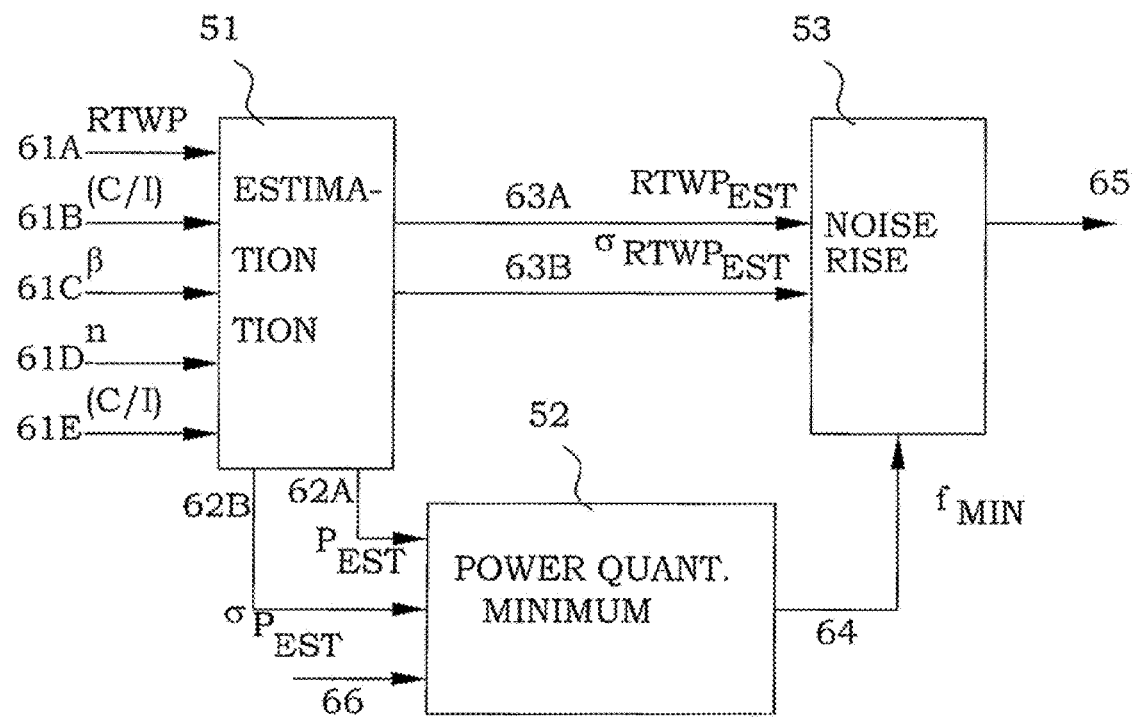
FIG. 3 is a schematic illustration of functionality blocks of an embodiment of a soft load estimation approach.

With reference to FIG. 3, an embodiment of another possible solution provides a different principle, based on soft estimation of the thermal noise power floor and the noise rise. In the most advanced form, the possible noise rise estimation is performed in three main blocks 51, 52, 53.

The first block 51, i.e. the power estimation block, applies an estimation algorithm for estimation of certain power quantities that are needed by subsequent processing blocks. In the present embodiment, the estimation is a so-called extended Kalman filter. Specifically, the block 51 receives a number of inputs 61A-E comprising the measured received total wideband power (RTWP) 61A, measured code power to interference ratio (C/I) of channel i 61B, beta factors for channel i 61C, number of codes for channel i 61D, corresponding to code power to interference ratio commanded by a fast power control loop 61E, and provides outputs comprising power estimates 62A, 63A and corresponding standard deviations 62B, 63B. The output 62A is an estimate of a power quantity being the sum of neighbor cell WCDMA interference power, in-band non-WCDMA interference power and thermal noise floor power, and the output 63A is the estimated received total wideband power (RTWP) and the output 63B is the corresponding variance. Together with the estimated mean values of the power quantities, the variances of the power quantities define estimated probability distribution functions (PDF's) of the power quantities. When the outputs are from an extended Kalman filter arrangement, these parameters are the only ones needed to define the estimated (approximate) Gaussian distributions that are produced by the filter. Thus, enough information is given to define the entire probability distribution information of the power estimates. The main scope of the present invention focuses on problems associated with this block 51.

A second block 52 applies in the present embodiment Bayesian estimation techniques in order to compute a conditional probability density function of an extreme value 64 of one of the above mentioned power quantities. The estimation is based on a number of estimated probability distributions from the first block 51. Parameters 66 giving information about a prior expected probability distribution of the noise floor power is in the present embodiment provided to the conditional probability distribution estimation block 52, in order to achieve an optimal estimation.

A third block 53 performs noise rise estimation. In the present embodiment, this is performed by a calculation of the conditional probability distribution of the quotient of the momentary estimated RTWP distribution 63A, 63B from block 51, and the conditional probability distribution of the noise power floor 64. The noise rise estimate 65 is preferably computed as a conditional mean of the conditional probability distribution of the quotient.

The embodiment of FIG. 3 has unfortunately certain minor disadvantages. For achieving the best possible estimation of the noise floor, it is desirable to utilize all input variables 61A-61E. However, the numerous inputs call for a very complex estimation algorithm, which in turn requires large computing power. Approximations may be provided by introducing complexity reductions, which approximations still give trustful estimations. Another drawback of using all inputs 61A-E for the estimation is that the corresponding measurements have to be available at the node performing the actual estimation. The measurements are typically performed in the RBS and estimation performed in the RBS will thus be possible. However, it may also be beneficial for e.g. the RNC to be able to perform such estimation. In such cases, all measurements have to be signalled to the RNC, which in practice becomes extremely resource demanding.

A practical solution for estimations performed at the RNC would be to base the estimation solely on the RTWP measurements 61A. However, in such a case, the estimation procedure will experience some troubles in heavily loaded systems. In fact, it is believed that in the future the scheduled enhanced uplink load may be high during very long periods in some cells. A load estimation solution based solely on the RTWP measurements could, under such circumstances lead to an erroneous estimate of the noise floor, since no, or at least very few, measurements at low total load is available. This could in turn lead to serious over-scheduling of users which could compromise cell stability. Such effect must be avoided.

Figure 4:
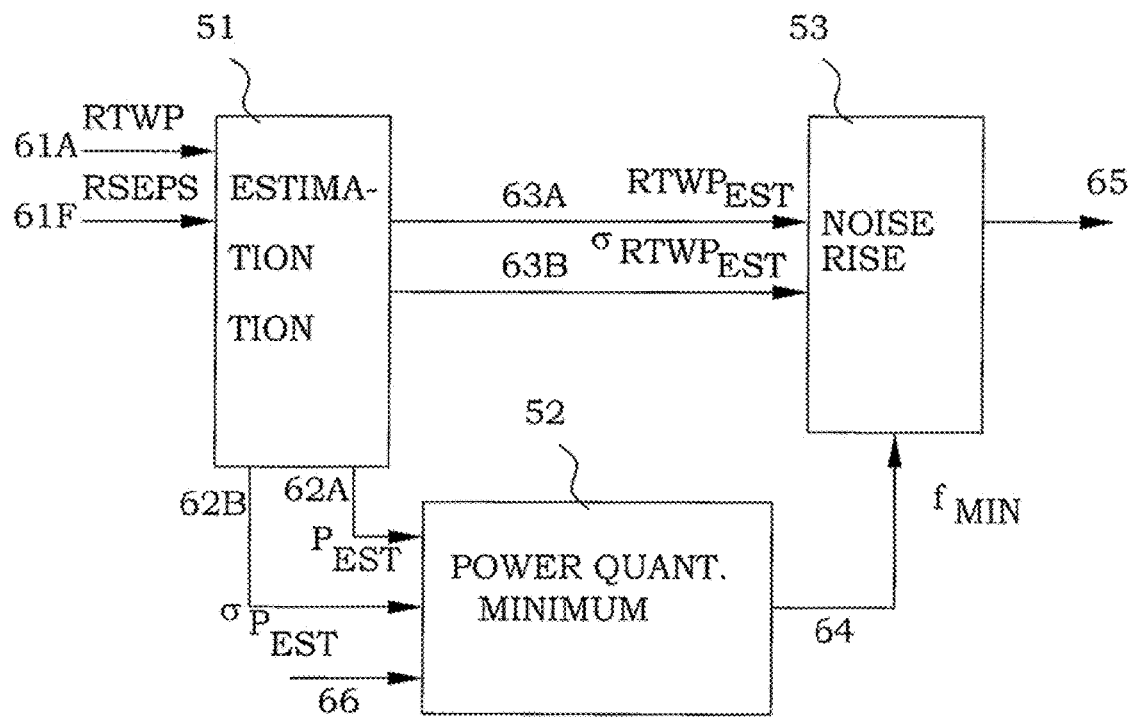
FIG. 4 is a schematic illustration of functionality blocks of an embodiment of a soft load estimation approach according to the present invention.

FIG. 4 illustrates an embodiment of a load estimation arrangement according to the present invention. In the most advanced form, the noise rise estimation is also here performed in three main blocks 51, 52, 53. However, in the present case the measurement inputs comprise two set of quantities. Measurements of RTWP 61A are as in previous example provided to the power estimation block 51. In addition, measurements of received scheduled enhanced uplink power 61F are also exploited as inputs to the power estimation block 51. A general assumption in the development is that both the RTWP measurement 61A and the measurement of received scheduled enhanced uplink power 61F experience the same signal chain. Put otherwise, it is required that they refer to the same noise power floor. Typically, this will be the case if RTWP is summed up at chip level and enhanced uplink power is computed by a suitable de-spreading operation, at the same stage of the digital receiver chain.

The received scheduled enhanced uplink power (RSEPS) in fact constitutes a part of the above mentioned sum of code powers $$\sum_{i=1}^{n} P_i^{Code}(t).$$

In a mathematical way it can be expressed as:

$$\sum_{i=1}^{n} P_i^{Code}(t) = RSEPS + P^{Voice}, \quad (3)$$

where $P^{Voice}$ represents transmissions not using enhanced uplink facilities, and comprises to a large part "normal" voice transmissions. The enhanced uplink transmissions may have properties of high and even load on the transmission power. At the contrary, voice transmissions are typically instead very bursty in their nature. Even at high voice transmission loads, there are instances, where the instantaneous contribution to the total power of a cell is low. This means that an estimate of an appropriate noise floor is probable if only voice transmissions are present.

A power quantity that would be very suitable for estimating the noise floor is a difference between the received total wideband power and the received scheduled enhanced uplink power. Such a power quantity will have contributions that typically are either very small or of a bursty character, which means that low values, in the vicinity of the true noise floor, are fairly probable.

Fortunately, recent releases of the NBAP and RNSAP protocols allow for signaling of received total wideband power (RTWP), estimated thermal noise floor as well as a quantity representing the received scheduled enhanced uplink power (RSEPS power). The quantity (RSEPS)t)) representing the RESPS is in the standards given as a logarithmic quotient between RSEPS power and RTWP. The quantity (RTWP(t)) representing the RTWP is in the standards given as the RTWP itself. Also, a noise floor measurement report is provided for in NBAP, also referred to as Reference Received Total Wide Band Power. The details of the encoding of these messages appear in publicly available standards, see [2], [3]. The encoding is not important as such for the present invention disclosure. However, it is important to understand that the present algorithm can be located on both sides of e.g. the NBAP interface, i.e. in both the RBS and the RNC.

In the examples below, an extended Kalman filter is used as a presently preferred, but not exclusive, example of an estimation algorithm useful within the present invention. Other non-exclusive examples on estimation algorithms that would be possible to use for the same purposes are: second order extended Kalman filtering, iterated extended Kalman filtering, Gaussian sum filtering, general non-linear Bayesian estimation and particle filtering, see e.g. [4].

An important part in all estimations is the state space and the measurement models. Below, an embodiment will be presented in detail. The generic state space model that is used to describe the powers of the cell used in the noise rise estimator is:

$$x(t+T)=a(x(t))+w(t)$$

$$y(t)=c(x(t))+e(t). \quad (4)$$

Here x(t) is a state vector consisting of various powers of relevance to a specific cell. The state variables are selected to correspond to cell power quantities. w(t) is the so called systems noise that represent the model error, y(t) is an output vector consisting of the power measurements performed in the cell. e(t) denotes the measurement error. a(x(t)) describes the, possibly nonlinear, dynamic modes, while the vector e(x(t)) is the, possibly nonlinear, measurement vector which is a function of the states of the system. Finally t represents the time and T represents the sampling period. The measurement functions of the state variables are selected to correspond to quantities representing the measured received total wideband power and quantities representing the measured received scheduled enhanced uplink power.

In order to provide an estimate of the residual power in the digital receiver, i.e. the received total wideband power minus the received scheduled enhanced uplink power, a model of at least one state needs to be introduced. If also a noise rise measure is to be computed, preferably at least two states are used. The selection of states is, as usual, in principle arbitrary. However, one natural choice in the present embodiment is to use one state that describes the RSEPS power and one state that describes "the rest" of the power, here denoted the residual power.

Noting that both these states describe powers and are therefore necessarily positive, they need to include a nonzero mean value. Such mean values are modeled as random walk components. It is further assumed that any power measurements defined logarithmically using e.g., the dBm scale has been transformed to the linear power domain before processing.

In the present embodiment, dynamics is furthermore modeled by providing additional state variables. Preferably, an additional state vector is selected to model dynamics of the estimated power quantity. This leads to the state definitions:

$$x_{RSEPSPower}(t+T) = \begin{pmatrix} x_{RSEPSPower}(t+T) \\ x_{RSEPSPowerDynamics}(t+T) \end{pmatrix} \quad (5)$$

$$= \begin{pmatrix} 1 & A^1_{RSEPSPower}(t) \\ 0 & A^2_{RSEPSPower}(t) \end{pmatrix} \begin{pmatrix} x_{RSEPSPower}(t) \\ x_{RSEPSPowerDynamics}(t) \end{pmatrix} + \begin{pmatrix} w_{RSEPSPower}(t) \\ w_{RSEPSPowerDynamics}(t) \end{pmatrix}$$

$$= \begin{pmatrix} 1 & A^1_{RSEPSPower}(t) \\ 0 & A^2_{RSEPSPower}(t) \end{pmatrix} x_{RSEPSPower}(t) + w_{RSEPSPower}(t).$$

$$x_{Residual}(t+T) = \begin{pmatrix} x_{Residual}(t+T) \\ x_{ResidualDynamics}(t+T) \end{pmatrix} \quad (6)$$

$$= \begin{pmatrix} 1 & A^1_{Residual}(t) \\ 0 & A^2_{Residual}(t) \end{pmatrix} \begin{pmatrix} x_{Residual}(t) \\ x_{ResidualDynamics}(t) \end{pmatrix} + \begin{pmatrix} w_{Residual}(t) \\ w_{ResidualDynamics}(t) \end{pmatrix}$$

$$= \begin{pmatrix} 1 & A^1_{Residual}(t) \\ 0 & A^2_{Residual}(t) \end{pmatrix} x_{Residual}(t) + w_{Residual}(t)$$

$$x(t) = \begin{pmatrix} x_{RSEPSPower}(t) \\ x_{Residual}(t) \end{pmatrix} \quad (7)$$

$$w(t) = \begin{pmatrix} w_{RSEPSPower}(t) \\ w_{Residual}(t) \end{pmatrix}. \quad (8)$$

Here (7) refers to (4). $x_{RSEPSPower}(t)$ denotes the state corresponding to the received scheduled enhanced uplink power that is represented by the fractional RSEPS quantity, $x_{RSEPSPowerDynamics}(t)$ denotes the power state variables that are used for modeling of the dynamics of the power that is represented by the RSEPS quantity. This dynamics is described by the matrices $A_{RSEPSPower}^1(t)$, and $A_{RSEPSPower}^2(t)$, where the time variation is introduced mainly to allow for the introduction of time variable adaptive spectral analysis processing. The quantity $w_{RSEPSPower}(t)$ is the process noise, i.e. the stochastic modeling error, of the power corresponding to the fractional RSEPS quantity. The notation is the same for the quantities that describe the residual power.

At this point is stressed that the quantity that is to be fed into the subsequent noise power floor estimation step is given by $x_{Residual}(t)$ and the corresponding estimated variance.

It remains to define the statistical properties of the process noise. As usual these quantities can be modeled as white Gaussian zero mean random processes that fulfill:

$$E[w_{RSEPSPower}(t)w_{RSEPSPower}^T(t)] = \begin{pmatrix} R_{1,RSEPSPower} & 0 \\ 0 & R_{1,RSEPSPowerDynamics} \end{pmatrix} \quad (9)$$

$$E[w_{Residual}(t)w_{Residual}^T(t)] = \begin{pmatrix} R_{1,Residual} & 0 \\ 0 & R_{1,ResidualDynamics} \end{pmatrix} \quad (10)$$

Here E[.] denotes statistical expectation. Note that the special case without power dynamics is readily obtained by deletion of the corresponding states and matrix blocks.

It can be noted here that the introduction of dynamics models by providing additional state variables can be applied in a more general case, e.g. on the embodiment of FIG. 3. That general setting also includes control variables u(t) which add a term b(t)u(t) to (4), where u(t) represents a known input and b(t) is a time varying gain function. Instead of (4), the following state space model is obtained:

$$x(t+T)=a(x(t))+b(t)u(t)+w(t)$$

$$(y(t)=e(x(t))+e(t). \quad (11)$$

The dynamics is then introduced as in (5) to (8) using one set of matrices for each code power. If only RTWP is measured, the code power matrices are obviously omitted.

First, general measurement modeling is considered. Noting that the RSEPS measurement, $RSEPS^{measurement}(t)$, available through the NBAP and RNSAP protocols is expressed as a logarithmic fraction of the RTWP measurement that is defined for joint measurement and defined on exactly the same time interval, it is clear that the measurement equation becomes nonlinear. The nonlinear measurement model is given by:

$$RSEPS^{measurement}(t) = q_{RSEPS}\left(10\log^{10}\left(\frac{x_{RSEPSPower}(t) + e_{RSEPSPower}(t)}{RTWP^{measurement}(t)}\right)\right). \quad (12)$$

Here $x_{RSEPSPower}(t)$ denotes the true power of the RSEPS quantity, $e_{RSEPSPowers}(t)$ denotes the corresponding measurement uncertainty and $q_{RSEPS}(.)$ is the quantization function of the RSEPS measurement. The RTWP measurement is similarly defined, $$RTWP^{measurement}(t)=q_{RTWP}(10\log^{10}(x_{Residual}(t)+x_{RSEPSPower}(t)+e_{RTWP}(t))+30). \quad (13)$$

where the RTWP is measured in dBm and where all power state variables are in Watts. The notation parallels that of the RSEPS measurement. The measurement disturbances are assumed to be zero mean, Gaussian and white, with:

$$E[e_{RSEPSPower}(t))]^2=R_{2,RSEPSPower} \quad (14)$$

$$E[e_{RTWP}(t)]^2=R_{2,RTWP} \quad (15)$$

The quantization is normally fine enough to be neglected. If not, it can be handled as know in prior art. Here it is assumed that the quantization is neglected.

First, cases where measurements of the RTWP power and RSEPS are related to each other, i.e. where the quantities representing RSEPS measurement are given in terms dependent on the RTWP, are described. In more specific words, a first selected measurement function corresponds to a linear or logarithmic quotient between the received scheduled enhanced uplink power and the received total wideband power, and a second selected measurement function corresponds to the received total wideband power. The quantity representing RSEPS power measurement is thus given as a linear or logarithmic quotient relative to the RTWP.

In this embodiment, the original definition of (12) is retained, with the quantization effects neglected. This gives, after a Taylor series expansion:

$$RSEPS^{\log\ measurement}(t) \approx \quad (16)$$
$$10\log^{10}\left(\frac{x_{RSEPSPower}(t)}{x_{Residual}(t) + x_{RSEPSPower}(t)}\right) + e_{\log\ RSEPSCompensated}(t),$$

where $$E[e_{log\ RSEPSCompensated}(t)]^2 \approx \quad (17)$$
$$\left(\frac{10}{\log(10)}\right)^2 \left(\left(\frac{1}{RTWP^{powermeasurement}(t)}\right)^2 R_{2,RTWP} + \left(\frac{1}{RSEPS^{powermeasurement}(t)}\right)^2 R_{2,RSEPSPower}\right).$$

Here and $RTWP^{powermeasurement}(t)$ and $RSEPS^{powermeasurement}(t)$ are the artificial power measurements in watts, that result when (13) and (16) are solved for the state variables. A similar treatment of (13) results in:

$$RTWP^{log\ measurement}(t) \approx \quad (18)$$
$$10\log^{10}\left(\frac{x_{RSEPSPower}(t) + x_{Residual}(t)}{}\right) + 30 + e_{log\ RTWPcompensated}(t),$$

where $$E[e_{log\ RTWPCompensated}(t)]^2 \approx \quad (19)$$
$$\left(\frac{10}{\log(10)}\right)^2 \left(\left(\frac{1}{RTWP^{powermeasurement}(t)}\right)^2 R_{2,RTWP}\right).$$

Furthermore, the cross coupling becomes:

$$E[e_{logRTWPCompensated}(t)e_{logRSEPSCompensated}(t)] \approx \quad (20)$$
$$-\left(\frac{10}{\log(10)}\right)^2 \left(\left(\frac{1}{RTWP^{powermeasurement}(t)}\right)^2 R_{2,RTWP}\right).$$

It follows that the measurement equations corresponding to (4) can be formulated as:

$$y(t) = x(x(t)) + e(t) \quad (21)$$

$$y(t) = \begin{pmatrix} RSEPS^{log\ measurement}(t) \\ RTWP^{log\ measurement}(t) \end{pmatrix} \quad (22)$$

$$c(x(t)) = \begin{pmatrix} 10\log^{10}\left(\frac{x_{RSEPSPower}(t)}{x_{RSEPSPower}(t) + x_{Residual}(t)}\right) \\ 10\log^{10}(x_{RSEPSPower}(t) + x_{Residual}(t)) + 30 \end{pmatrix} \quad (23)$$

$$e(t) = \begin{pmatrix} e_{log\ RSEPSCompensated}(t) \\ e_{log\ RTWPCompensated}(t) \end{pmatrix} \quad (24)$$

$$R_2(t) = \quad (25)$$
$$\left(\frac{10}{\log(10)}\right)^2 \cdot \left(\begin{pmatrix} \frac{1}{RSEPS^{powermeasurement}} & \frac{-1}{RTWP^{powermeasurement}} \\ 0 & \frac{1}{RTWP^{powermeasurement}} \end{pmatrix}\right) \cdot$$
$$\begin{pmatrix} R_{2,RSESPower} & 0 \\ 0 & R_{2,RTWP} \end{pmatrix} \cdot$$
$$\begin{pmatrix} \left(\frac{1}{RSEPS^{powermeasurement}}\right) & 0 \\ \left(\frac{-1}{RTWP^{powermeasurement}}\right) & \left(\frac{1}{RTWP^{powermeasurement}}\right) \end{pmatrix}.$$

In another embodiment, based on linear measurements, the original definition of (12) is only transformed to the linear power domain, with the quantization effects neglected. This gives, after a Taylor series expansion:

$$RSEPS^{linearmeasurement}(t) \equiv \quad (26)$$
$$10^{\left(\frac{RSEPS^{linearmeasurement}(t)}{10}\right)} \approx \frac{x_{RSEPSPower}(t)}{x_{Residual}(t) + x_{RSEPSPower}(t)} +$$
$$\frac{e_{RSEPSPower}(t)}{x_{Residual}(t) + x_{RSEPSpower}(t)} - \frac{x_{RSEPSPower}(t)e_{RTWP}(t)}{(x_{Residual}(t) + x_{RSEPSPower}(t))^2} \equiv$$
$$\frac{x_{RSEPSPower}(t)}{x_{Residual}(t) + x_{RSEPSPower}} + e_{RSEPSCompensated}(t).$$

Here $$E[e_{RSEPSCompensated}(t)]^2 \approx \left(\frac{RSEPS^{linearmeasurement}(t)}{RTWP^{linearmeasurement}(t)}\right)^2 R_{2,RTWP} + \quad (27)$$
$$\left(\frac{1}{RTWP^{linearmeasurement}(t)}\right)^2 R_{2,RSEPSPower}.$$

A similar treatment of (13) results in:

$$RTWP^{linearmeasurement}(t) \equiv 10^{\left(\frac{RTWP^{measurement}(t)}{10}\right)} - 30 \quad (28)$$
$$= (x_{RSEPSPower}(t) + x_{Residual}(t)) + e_{RTWPlinear}(t)$$

Hence the variance of (28), and the cross-coupling with (26) becomes:

$$E[e_{RTWPlinear}(t)]^2 = R_{2,RTWP} \quad (29)$$

$$E[e_{RSEPSCompensated}(t)e_{RTWPlinear}(t)]^2 = \quad (30)$$
$$-\left(\frac{RSEPS^{linearmeasurement}(t)}{RTWP^{linearmeasurement}}\right) R_{2,RTWP}.$$

It follows that the measurement equations corresponding to (4) can be formulated as:

$$y(t) = c(x(t)) + e(t) \quad (31)$$

$$y(t) = \begin{pmatrix} RSEPS^{linearmeasurement}(t) \\ RTWP^{linearmeasurement}(t) \end{pmatrix} \quad (32)$$

$$c(x(t)) = \begin{pmatrix} \frac{x_{RSEPSPower}(t)}{(x_{RSEPSPower}(t) + x_{Residual}(t))} \\ x_{RSEPSPower}(t) + x_{Residual}(t) \end{pmatrix} \quad (33)$$

$$e(t) = \begin{pmatrix} e_{RSEPSCompensated}(t) \\ e_{RTWPlinear}(t) \end{pmatrix} \quad (34)$$

$$R_2(t) = \begin{pmatrix} \left(\frac{1}{RTWP^{linearmeasurement}}\right) & \left(\frac{-RSEPS^{linearmeasurement}}{RTWP^{linearmeasurement}(t)}\right) \\ 0 & 1 \end{pmatrix}$$
$$\cdot \begin{pmatrix} R_{2,RSEPSPower} & 0 \\ 0 & R_{2,RTWP} \end{pmatrix}$$
$$\cdot \begin{pmatrix} \left(\frac{1}{RTWP^{linearmeasurement}}\right) & 0 \\ \left(\frac{-RSEPS^{linearmeasurement}}{RTWP^{linearmeasurement}(t)}\right) & 1 \end{pmatrix}. \quad (35)$$

Now, a case where the quantities representing measurements of the RTWP and RSEPS power are separated is described. In this case, the available quantities representing the RSEPS power measurement, $RSEPSPower^{measurement}(t)$, are given directly in terms of power and not dependent on the RTWP. In more specific words, a first selected measurement function corresponds to the received scheduled enhanced uplink power, and a second selected measurement function corresponds to the received total wideband power. In this subsection, the measurements are first linearized. Towards that end it is assumed that $RTWP(t) \gg e_{RTWP}(t)$. This implies the following approximation of (12) using a Taylor series expansion:

$$RSEPS^{linermeasurement}(t) \equiv \quad (36)$$

$$10^{\left(\frac{RSEPS^{linearmeasurement}(t)}{10}\right)} \approx \frac{x_{RSEPSPower}(t)}{x_{Residual}(t) + x_{RSEPSPower}(t)} + \frac{e_{RSEPSPower}(t)}{x_{Residual}(t) + x_{RSEPSPower}(t)} - \frac{x_{RSEPSPower}(t)e_{RTWP}(t)}{(x_{Residual}(t) + x_{RSEPSPower}(t))^2}$$

which implies:

$$RSEPSPower^{measurement}(t) \equiv \quad (37)$$

$$(x_{Residual}(t) + x_{RSEPSPower}(t))RSEPS^{linearmeasurement}(t) \approx$$

$$x_{RSEPSPower}(t) + e_{RSEPSPower}(t) -$$

$$\frac{x_{RSEPSPower}(t)}{(x_{Residual}(t) + x_{RSEPSPower}(t))}e_{RTWP}(t) =$$

$$x_{RSEPSPower}(t) + e_{RSEPSPowerCompensated}(t).$$

Finally, assuming independence between the power noises, it follows that $$E[e_{RSEPSPowerCompensated}(t)]^2 \approx (RSEPS^{Powermeasurement}(t))^2 R_{2,RTWP} + R_{2,RSEPSPower}. \quad (38)$$

A similar treatment of (13) results in $$RTWP^{linearmeasurement}(t) \equiv 10^{\left(\frac{RTWP^{measurement}(t)}{10}\right)} - 30 \quad (39)$$

$$= (x_{RSEPSPower}(t) + x_{Residual}(t)) + e_{RTWPlinear}(t)$$

Hence the variance of (39), and the cross-coupling with (37) becomes:

$$E[e_{RTWPlinear}(i)]^2 = R_{2,RTWP} \quad (40)$$

$$E[e_{RSEPSPowerCompensated}(t)e_{RTWPlinear}(t)]^2 = -(RSEPS^{linearmeasurement}(t))R_{2,RTWP}. \quad (41)$$

Next, using the artificial measurement defined by (37) (41), it follows that the measurement equations corresponding to (4) can be formulated as:

$$y(t) = c(x(t)) + e(t) = C(t)x(t) + e(t) \quad (42)$$

$$y(t) = \begin{pmatrix} RSEPSPower^{measurement}(t) \\ RTWP^{linearmeasurement}(t) \end{pmatrix} \quad (43)$$

$$C(t) = \begin{pmatrix} 1 & 0 & \cdots & 0 & 0 & 0 & \cdots & 0 \\ 1 & 0 & \cdots & 0 & 1 & 0 & \cdots & 0 \end{pmatrix} \quad (44)$$

$$e(t) = \begin{pmatrix} e_{RSEPSPowerCompensated}(t) \\ e_{RTWPlinear}(t) \end{pmatrix} \quad (45)$$

$$R_2(t) = \begin{pmatrix} 1 & -RSEPS^{linearmeasurement}(t) \\ 0 & 1 \end{pmatrix}$$

$$\cdot \begin{pmatrix} R_{2,RSEPSPower} & 0 \\ 0 & R_{2,RTWP} \end{pmatrix}$$

$$\cdot \begin{pmatrix} 1 & 0 \\ -RSEPS^{linearmeasurement}(t) & 1 \end{pmatrix}. \quad (46)$$

The above equations define the linearized embodiment of the measurement process.

Another possibility is given by selecting the input signal to the actual estimation algorithm as artificial measurements obtained from the true original measurements. An input signal of RSEPS power to the actual estimation algorithm can be an artificial input deduced from the quantities representing the measurements of RTWP and RSEPS power, respectively. The above approach can thereby be used also in cases where the quantities representing the measurements of RSEPS power are in the quotient form, by simply multiplying the quotient and the RTWP into a new artificial measurement.

Since the quantity of highest final interest is the residual power, the trick of defining new artificial measurements can be used again. New artificial measurements can be defined that are approximations of the fractional residual power. In such a case, a first selected measurement function corresponds to a complementary quotient between the received scheduled enhanced uplink power and the received total wideband power, and a second selected measurement function corresponds to the received total wideband power. The term "complementary quotient" means here the complementary part up to unity, i.e. 1 minus the quotient. In mathematical form, this is given as:

$$RSEPS\text{Complement}(t) = 1 - RSEPS^{linearmeasurement}(t). \quad (47)$$

Note, however, that measurement needs to be augmented with the RTWP measurement in the filtering in order to produce an absolute power value necessary for further processing. The measurement equations then have to be modified correspondingly.

There is even a possibility to use the single-input solution of the load estimator, by using the artificial measurement approach. In such a case, a single measurement input can be defined as the residual power. This is achieved by combining quantities representing the RTWP and the RSEPS power, respectively. A first selected measurement function then corresponds to a complementary received scheduled enhanced uplink power. Note that two measurements are still needed, however, these are combined prior to the processing of the Kalman filter. The term "complementary power" means here the complementary part up to the RTWP, i.e. RTWP minus RSEPS power or RTWP times 1 minus the RSEPS quotient. In mathematical form, this is given as:

$$RSEPS\text{PowerComplement}(t) = (1 - RSEPS^{linearmeasurement}(t))RTWP^{linearmeasurement}(t). \quad (48)$$

In this case a single state corresponding to the residual power $x_{Residual}(t)$ can be used in the estimation algorithm. However, since the outputs from the estimation filter preferably are utilized also e.g. for later noise rise estimation, it is preferred to have an estimate of the RTWP available. Thus, a second selected measurement function corresponds to the received total wideband power. The measurement equations then have to be modified correspondingly.

The details of the single input Kalman filter is:

Initialization (49)

$x^{RSEPC}(t_0 \mid t_0 - T) = x_0^{RSEPC}$ $P^{RSEPC}(t_0 \mid t_0 - T)$ $t := t_0 - T$ Iteration $t := t + T$ $K_f^{RSEPC}(t) = \dfrac{P^{RSEPC}(t \mid t - T)}{P^{RSEPC}(t \mid t - T) + R_2^{RSEPC}}$ $x^{RSEPC}(t \mid t) = x^{RSEPC}(t \mid t - T) + K_f^{RSEPC}(t)\begin{pmatrix} y^{RSEPC}(t) - \\ x^{RSEPC}(t \mid t - T) \end{pmatrix}$ $P^{RSEPC}(t \mid t) = P^{RSEPC}(t \mid t - T) - K_f^{RSEPC}(t)P^{RSEPC}(t \mid t - T)$ $x^{RSEPC}(t + T \mid t) = x^{RSEPC}(t \mid t)$ $P^{RSEPC}(t + T \mid t) = P^{RSEPC}(t \mid t) + R_1^{RSEPC}$ End.

In (49) RSEPC is an abbreviation for RSEPSPower-Complement, cf. (48). $x^{RSEPC}(t \mid t-T)$ denotes the one step prediction of the RSEPC while $x^{RSEPC}(t \mid t)$ is the Kalman filter estimate. The corresponding variances are $P^{RSEPCP}(t \mid t-T)$ and $P^{RSEPCP}(t \mid t)$, respectively. $K_f^{RSEPC}(t)$ is the time variable Kalman filter gain.

In the above relations, it has been assumed that the states correspond to certain physically meaningful powers. However, any linear superpositions of the RSEPS power and the RTWP can be utilized as states, as long as they are linearly independent. Another obvious choice is to have the RSEPS power and the RTWP themselves as states. Yet another choice is to have the RTWP and the residual power as states. In the latter case, estimates of the residual power is easily utilized for noise floor determination, whereas estimations of the RTWP may be used in a later stage for noise rise estimation.

To describe the procedure of linear superposition, assume for simplicity that no dynamics is included in the state model. Define new states by:

$\begin{pmatrix} x_1(t) \\ x_2(t) \end{pmatrix} = \begin{pmatrix} t_{11} & t_{12} \\ t_{21} & t_{23} \end{pmatrix} \begin{pmatrix} x_{RSEPSPower}(t) \\ x_{Residual}(t) \end{pmatrix}$ (50)

Here $T = \begin{pmatrix} t_{11} & t_{12} \\ t_{21} & t_{23} \end{pmatrix}$ (51)

is a non-singular transformation matrix. Note that when such a matrix has been defined, the states:

$\begin{pmatrix} x_1(t) \\ x_2(t) \end{pmatrix}$ (52)

are used in the state model of the Kalman filter. New measurement equations are formed, corresponding to the alternatives discussed above, by inserting the relation:

$\begin{pmatrix} x_{RSEPSPower}(t) \\ x_{Residual}(t) \end{pmatrix} = \begin{pmatrix} t_{11} & t_{12} \\ t_{21} & t_{23} \end{pmatrix}^{-1} \begin{pmatrix} x_1(t) \\ x_2(t) \end{pmatrix}$ (53)

in the measurement equations. The same procedure as outlined above, using Taylor series expansions, is then followed to arrive at the remaining quantities required for processing with the extended Kalman filter.

The following are important special cases, mentioned above:

$\begin{pmatrix} x_{RSEPSPower}(t) \\ x_{RTWP}(t) \end{pmatrix} = \begin{pmatrix} 1 & 0 \\ 1 & 1 \end{pmatrix} \begin{pmatrix} x_{RSEPSPower}(t) \\ x_{Residual}(t) \end{pmatrix}$ (54)

$\begin{pmatrix} x_{Residual}(t) \\ x_{RTWP}(t) \end{pmatrix} = \begin{pmatrix} 0 & 1 \\ 1 & 1 \end{pmatrix} \begin{pmatrix} x_{RSEPSPower}(t) \\ x_{Residual}(t) \end{pmatrix}.$ (55)

One specific problem with the above models is the unknown dynamics expressed by the matrices of (5) and (6). In case they cannot be determined a priori, they need to be estimated on-line. This is a standard signal processing problem which can be dealt with in many ways. One particular way to handle the problem is to introduce parameterizations of the models by means of extension of the state vector x(t) of (4), by an unknown parameter vector θ(t), i.e. by definition of a new state vector:

$\bar{x}(t) = \begin{pmatrix} x(t) \\ \theta(t) \end{pmatrix}.$ (56)

The extended Kalman filter below is then applied with this joint state vector, resulting in adaptive estimation of the sought quantities. The estimation thereby comprises so-called adaptive spectral estimation, in the present embodiment the spectral estimation corresponds to the additional state variable modeling the dynamics of the state.

In order to illustrate the procedure, consider the case were an autoregressive model is to be estimated for the residual power of (6). This can be obtained by the introduction of the regression model:

$x_{ResidualDynamics}(t+T) = -\alpha_1 x_{ResidualDynamics}(t) - \ldots - \alpha_n x_{ResidualDynamics}(t-(n-1)T),$ (57)

where the unknown parameter vector is given by:

$\theta(t) = \begin{pmatrix} a_1(t) \\ \vdots \\ a_n(t) \end{pmatrix}.$ (58)

By postulation of the random walk model $\theta(t+T) = \theta(t) + w_\theta(t)$ (59)

$E[w_\theta(t)w_\theta^T(t)] = R_{1,\theta}$ (60)

It follows that (6) can be generalized to a form described by (4) as follows:

$$\bar{x}_{Residual}(t+T) = \begin{pmatrix} x_{Residual}(t+T) \\ x_{1,ResidualDynamics}(t+T) \\ \vdots \\ x_{n+1,ResidualDynamics}(t+T) \\ x_{n,ResidualDynamics}(t+T) \\ a_1(t+T) \\ \vdots \\ a_n(t+T) \end{pmatrix} \quad (61)$$

$$= \begin{pmatrix} x_{Residual}(t) + \varphi^T(t)\theta(t) \\ x_{2,ResidualDynamics}(t) \\ \vdots \\ x_{n,ResidualDynamics}(t) \\ 0 \\ a_1(t) \\ \vdots \\ a_n(t) \end{pmatrix} + \begin{pmatrix} w_{Residual}(t) \\ w_{ResidualDynamics}(t) \\ w_\theta(t) \end{pmatrix}$$

$$= a(\bar{x}(t)) + \begin{pmatrix} w_{Residual}(t) \\ w_{ResidualDynamics}(t) \\ w_\theta(t) \end{pmatrix},$$

where $$\varphi^T(t) = (-x_{1,ResidualDynamics}(t) \cdots -x_{n,ResidualDynamics}(t))^T. \quad (62)$$

Many other alternatives are possible. It is e.g. possible to apply spectral estimation off-line and to define completely linear schemes.

All quantities have now been defined and the estimation algorithm can be applied with any combination of state model and measurement model above. In the present embodiment an extended Kalman filter is applied. This filter is given by the following matrix and vector iterations.

$$C(t) = \left. \frac{\partial c(x)}{\partial x} \right|_{x \propto \hat{x}(t|t-T)} \quad (63)$$

$$K_f(t) = P(t|t-T)C^T(t)(C(t)P(t|t-T)C^T(t) + R_2(t))^{-1}$$

$$\hat{x}(t|t) = \hat{x}(t|t-T) + K_f(t)(y(t) - C(t)\hat{x}(t|t-T))$$

$$P(t|t) = P(t|t-T) - K_f(t)C(t)P(t|t-T)$$

$$A(t) = \left. \frac{\partial a(x)}{\partial x} \right|_{x \propto \hat{x}(t|t)}$$

$$\hat{x}(t+T|t) = Ax(t|t) + Bu(t)$$

$$P(t+T|t) = AP(t|t)A^T + R_1(t).$$

The quantities introduced by the filter iterations (63) are as follows. $\hat{x}(t|t-T)$ denotes the state prediction, based on data up to time $t-T$, $\hat{x}(t|t)$ denotes the filter update, based on data up to time $t$, $P(t|t-T)$ denotes the covariance matrix of the state prediction, based on data up to time $t-T$, and $P(t|t)$ denotes the covariance matrix of the filter update, based on data up to time $t$. $C(t)$ denotes the linearized measurement matrix (linearization around most current state prediction), $K_f(t)$ denotes the time variable Kalman gain matrix, $R_2(t)$ denotes the measurement covariance matrix, and $R_1(t)$ denotes the system noise covariance matrix. It can be noted that $R_1(t)$ and $R_2(t)$ are often used as tuning variables of the filter. In principle the bandwidth of the filter is controlled by the matrix quotient of $R_1(t)$ and $R_2(t)$ The filter is initialized by providing initial values to $\hat{x}(t|t-T)$ and $P(t|t-T)$. By the estimation described above, a probability distribution for a first power quantity is achieved. The first power quantity is related to the selected state variables, preferably the difference between received total wideband power and received scheduled enhanced uplink power. The probability distribution is achieved from the quantities representing the measured received total wideband power and the quantities representing the measured received scheduled enhanced uplink power using the selected measurement functions. This probability distribution can be further utilized e.g. for load estimation purposes, as described here below. It may also be transmitted to other units, where subsequent evaluations are performed. In such a way, the probability distribution from block 51 can be achieved in one node, while subsequent steps in providing e.g. the noise rise are performed in another node.

Returning to FIG. 4, the different block 51-53 may be provided in one or different units or nodes. The actual operation of the noise rise estimation is however not affected. The second block 52 in the present embodiment uses a number of the probability distribution provided by the first block 51 and applies Bayesian estimation techniques in order to compute a conditional probability density function of an extreme value 64 of the above mentioned first power quantity. Typically, this extreme value is a minimum, representing a noise floor measure.

A third block 53 provides load reference data based on the computed conditional probability distribution of the noise floor measure, obtained from the second block 52. The load reference data is in the present embodiment a noise rise estimation. The provision of load reference data comprises in the present embodiment calculation of a soft noise rise measure. The soft noise rise measure is a conditional mean of a conditional probability distribution of a quotient of an estimated received total wideband power and the conditional probability distribution of the noise floor measure.

In other applications, other load reference data may be of interest, e.g. the noise floor estimate itself. A final step of providing load reference data may then comprise calculation of a mean value of the conditional probability distribution of the noise floor measure as the requested noise floor estimate.

Figure 5A:
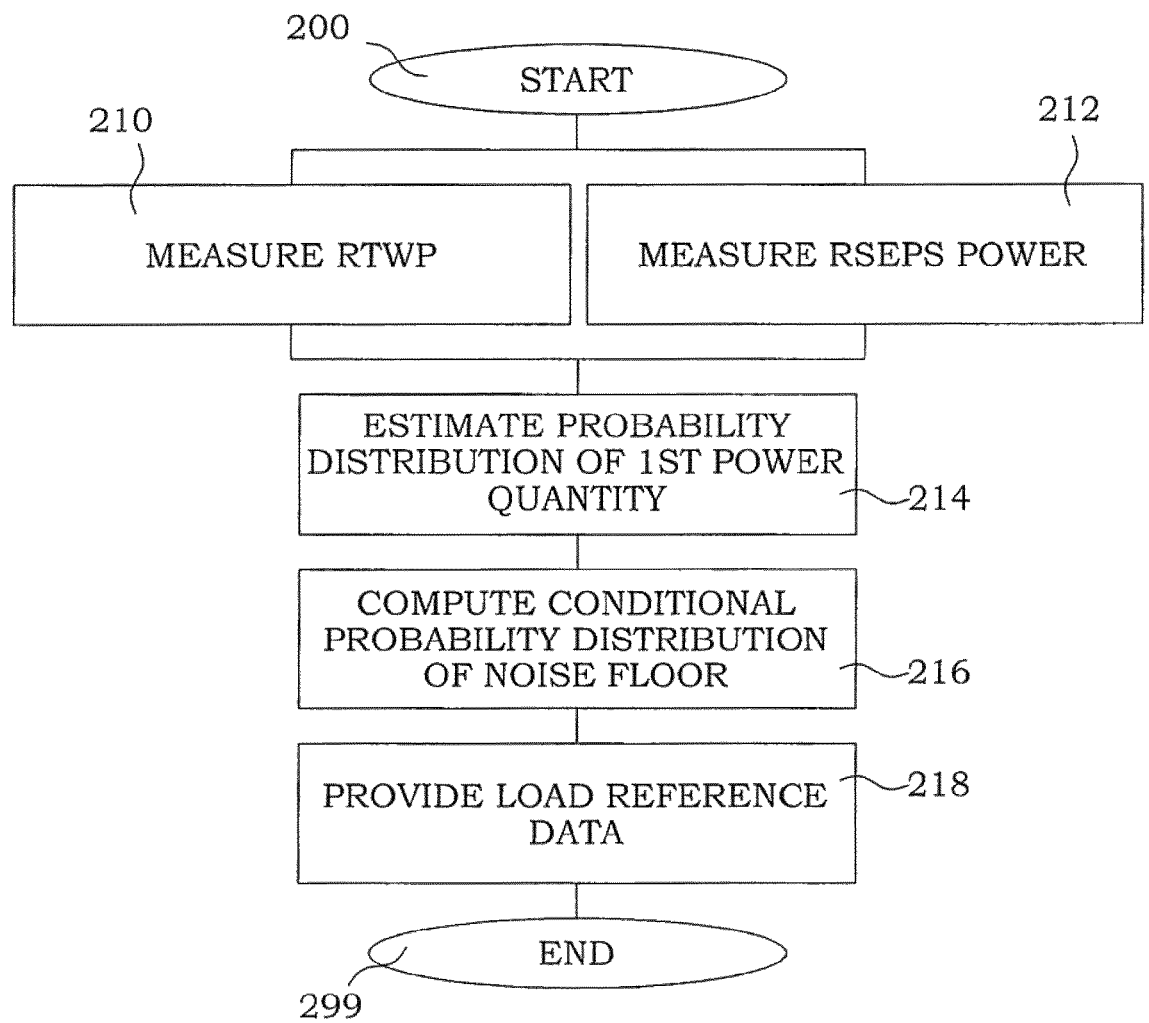
FIG. 5A is a flow diagram of main steps of an embodiment of a method according to the present invention.

An embodiment of a method according to the present invention can be summarized and illustrated by the flow diagram of FIG. 5A. The procedure for providing load reference data in a CDMA wireless communication system starts in step 200. In step 210, received total wideband power is measured at a plurality of instances. In step 212 received scheduled enhanced uplink power is measured for the same plurality of instances, and under the same radio chain conditions. Steps 210 and 212 are therefore typically performed simultaneously. Quantities representing the measured powers are thereby provided. In particular embodiments, the quantities representing the measured received scheduled enhanced uplink power are quotients between the measured received scheduled enhanced uplink power and the measured received total wideband power.

In step 214, a probability distribution for a first power quantity is estimate. The first power quantity is related to selected state variables of an estimation algorithm, and is in a preferred embodiment a measure of the difference between received total wideband power and received scheduled enhanced uplink power. The selected state variables correspond to cell power quantities. The estimation is made from the quantities representing the measured received total wideband power and the quantities representing the measured received scheduled enhanced uplink power. The estimation uses selected measurement functions of the selected state variables. The selected measurement functions correspond to the quantities representing the measured received total wideband power and the quantities representing the measured received scheduled enhanced uplink power.

A conditional probability distribution of a noise floor measure is computed in step 216, based on at least a number of the estimated probability distributions for the first power quantity. In step 218, load reference data is provided based on the computed conditional probability distribution of the noise floor measure. The procedure ends in step 299.

As described further above, the load reference data provided by a method according to the present invention, e.g. the embodiment of FIG. 5A can be used in various ways. The invention relates to the field of load estimation in code division multiple access cellular telephone systems. Several radio resource management. (RRM) algorithms such as enhanced uplink scheduling and admission control rely on accurate estimates of the uplink to ad.

Figure 5B:
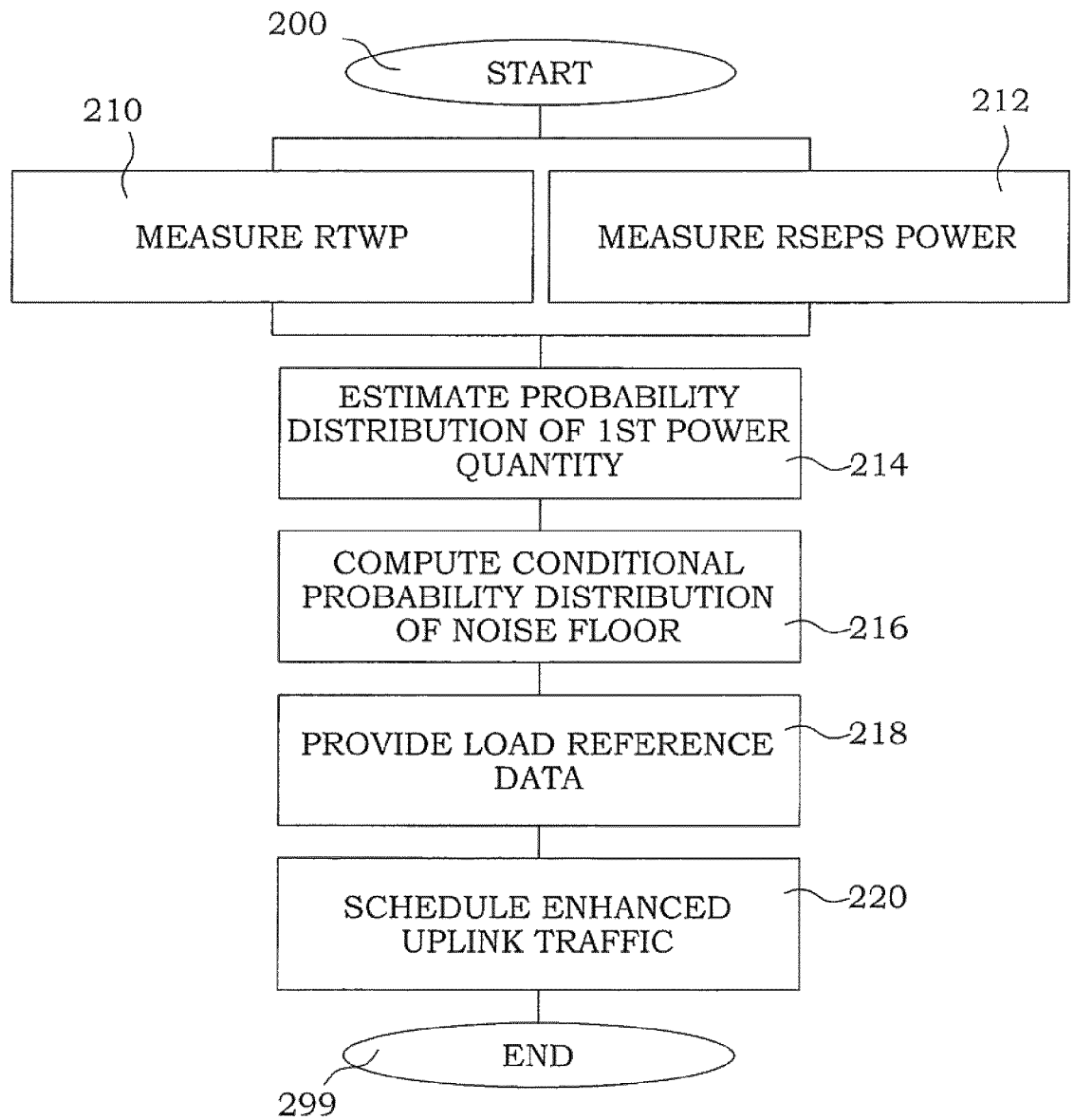
FIG. 5B is a flow diagram of main steps of an embodiment of another method according to the present invention.

In order to retain the stability of the cell, and to increase the capacity, fast enhanced uplink scheduling algorithms operate to maintain the load below a certain level. Enhanced uplink traffic can be scheduled based on the load reference data. This is typically performed in the RBS. FIG. 5B is a flow diagram illustrating steps of an embodiment of a method for enhanced uplink traffic scheduling according to the present invention. Steps 200-218 and 299 are similar as in FIG. 5A. In step 220, enhanced uplink traffic is scheduled based on the load reference data.

Figure 5C:
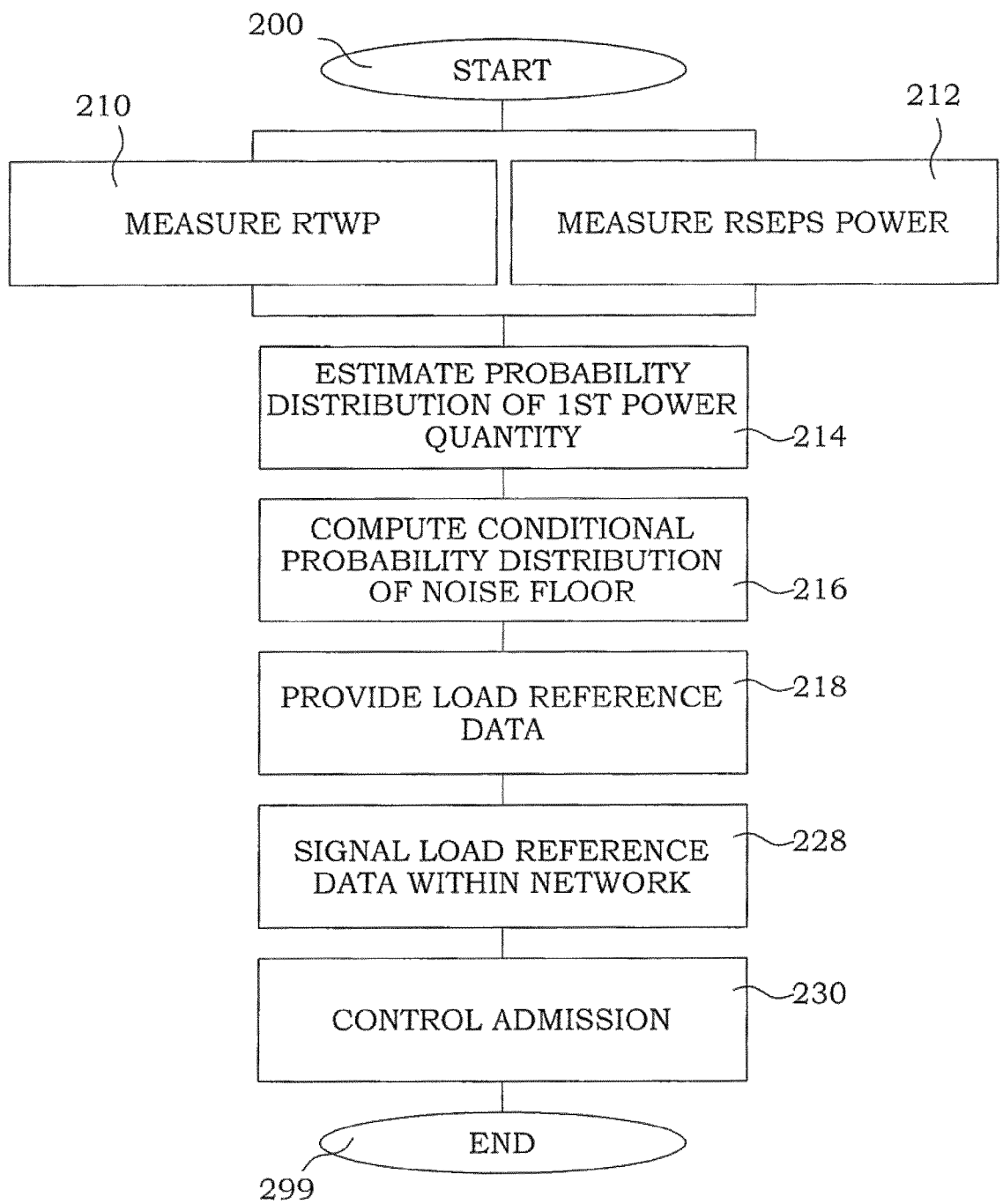
FIG. 5C is a flow diagram of main steps of an embodiment of yet another method according to the present invention.

The admission control and congestion control functionality in the radio network controller (RNC), that controls a number of RBSs, also benefits from accurate information on the momentary noise rise of each cell it controls. The bandwidth by which the RNC functionality affect the cell performance is significantly slower than what was described above, for enhanced uplink scheduling, however the impacts on cell stability that was discussed above for enhanced uplink are also valid to some extent for the admission control functionality of the RNC. The RNC therefore also benefits from the provision of load reference data and may base admission control on such toad reference data. FIG. 5C is a flow diagram illustrating steps of an embodiment of a method for admission control according to the present invention. Steps 200-218 and 299 are similar as in FIG. 5A. In step 228, load reference data in signaled to another node of the communication network, typically the RNC. This step can of course be exchanged for other data signaling steps earlier in the method flow, if one or several of the steps 214-218 are performed in the RNC. In step 230, admission is controlled based on the load reference data.

The algorithms above are easily applied at any point in a receiver signal processing chain for estimation of the noise rise. For instance, the estimation can be performed on signals as seen after an interference cancellation step.

Interference cancellation, or multi-user detection, is a technique that aims at reducing the interference in radio receivers. In its most basic form the technique can be explained as follows. Consider a CDMA communication system with two terminals that simultaneously communicate with a base station. In order to decode the transmissions from the terminals a number of signal processing steps are typically applied in the base station. The result of these steps produces a channel model describing e.g. multi-path radio propagation, typically expressed as a finite impulse response (FIR) filter and a decoded symbol sequence. The quality of the above two quantities are negatively affected by the interference caused by the transmission of the other terminals, since CDMA systems use one single frequency band for communication. The idea of one particular embodiment of interference cancellation (IC) is to use the estimated channel model of one of the users, together with the decoded transmission to produce a model of the resulting interference in the receiver and to subtract this simulated interference from the received total signal, when performing a renewed channel estimation and decoding for the other user. In case the simulated model is good, the interference conditions for the other user may be radically improved, hence improving both the channel model and the decoding of the other user. The above procedure can then be reversed to perform IC for the other user/interference pair. It is easy to understand that the procedure can be further improved by performing several iterations using the above steps repeatedly.

Modern interference cancellation algorithms formulate the above procedure as a so called multi-user detection problem, were the above steps are performed jointly for all users in a cell, using matrix formulations.

Performing the load estimation on an interference-cancelled signal, the RTWP measurement becomes a corresponding interference-cancelled received total wideband power measurement, i.e. as seen after interference cancellation. In other words, first interference cancellation is performed on the actual received radio signals. Then the measurement steps of received total wideband power and received scheduled enhanced uplink power are performed.

Figure 6:
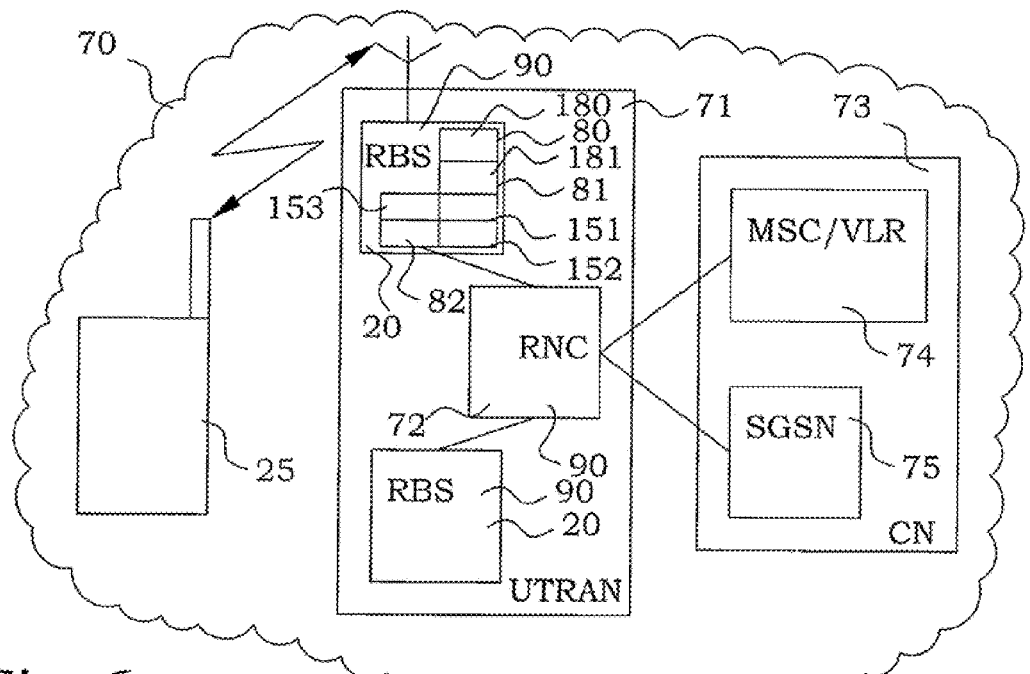
FIG. 6 is a block diagram of main parts of an embodiment of a system according to the present invention.

FIG. 6 illustrates a COMA wireless communications system 70 comprising at least one node 90 benefiting from accurate load estimations. In the description above, it is assumed that the power estimations concern uplink communication. The power measurements are in such cases performed by a node 90 in a Universal mobile telecommunication system Terrestrial Radio Access Network (UTRAN) 71, typically a radio base station 20. A mobile terminal 25 is in radio contact with a RBS 20 in the UTRAN 71. Therefore, in this embodiment, the RBS 20 comprises means 80 for obtaining quantities representing measures of received total wideband power. Since the actual measurements are performed in the RBS as well, the means 80 for obtaining quantities representing measures of received total wideband power comprises in this embodiment measuring means 180 of received total wideband power. Furthermore, in this embodiment, the RBS 20 also comprises means 81 for obtaining quantities representing measures of received scheduled enhanced uplink power. Since the actual measurements are performed in the RBS as well, the means 81 for obtaining quantities representing measures of received scheduled enhanced uplink power comprises in this embodiment measuring means 181 of received scheduled enhanced uplink power.

In the present embodiment, the RBS 20 further comprises means 151 for estimating a probability distribution for a first power quantity, connected to the means 80 for obtaining quantities representing measures of received total wideband power and the means 81 for obtaining quantities representing measures of received scheduled enhanced uplink power. The estimation is made from quantities representing the measured received total wideband power and quantities representing the measured received scheduled enhanced uplink power. The means 151 for estimating is according to the description above arranged to operate with selected state variables corresponding to cell power quantities and with selected measurement functions of the state variables corresponding to the quantities representing the measured received total wideband power and the quantities representing the measured received scheduled enhanced uplink power. The first power quantity is related to the selected state variables. The means 151 for estimating is thereby arranged for estimating the probability distribution for the first power quantity using the selected measurement functions.

In the present embodiment, the RBS 20 further comprises means 152 for computing a conditional probability distribution of a noise floor measure, connected to said means 151 for estimating. The conditional probability distribution of a noise floor measure is based on at least a number of the estimated probability distributions for the first power quantity.

In the present embodiment, the RBS 20 also comprises means 153 for providing load reference data, connected to said means 151 for estimating and the means 152 for computing. The provision of load reference data is based on the computed conditional probability distribution of the noise floor measure.

In a preferred embodiment, the means 151 for estimating comprises the first block 51 of FIG. 4, and the means 152 for computing comprises the second block 52 of FIG. 4. The means 153 for providing load reference data comprises preferably the third block 53 of FIG. 4. However, in an alternative embodiment, the means 153 for providing load reference data may comprise means for establishing a mean value of the conditional probability distribution of the noise floor measure. These means 151-153 can be implemented as separate units or as at least partly integrated units.

In the embodiment of FIG. 6 the RBS 20 also comprises a transmitter 82 for transmitting the load reference data within the CDMA wireless communication system 70. The wireless communications system 70 comprises in this embodiment a UTRAN 71 and a core network CN 73. The RIBS 20 is controlled by a RNC 72, which in turn is connected to a Mobile services Switching Centre/Visitor Location Register (MSC/VLR) 74 and a Serving General packet radio system Support Node (SGSN) 75 of the core network CN 73. The embodiment of FIG. 6 is advantageously applied for enhanced uplink traffic scheduling.

In a specific embodiment according to FIG. 6, the means 153 for providing load reference data comprises means for establishing a mean value of the conditional probability distribution of the noise floor measure. This means value can be transferred by the transmitter 82 as a measure of the noise floor together with a measure, of the RTWP to the RNC 72. The RNC 72 then comprises means for performing a division of the RTWP with the noise floor measure for achieving a noise rise measure. The noise rise measure is then possible to utilize e.g. for admission control purposes. The transmitter 82 may then operate e.g. according to the NBAP standard.

Figure 7:
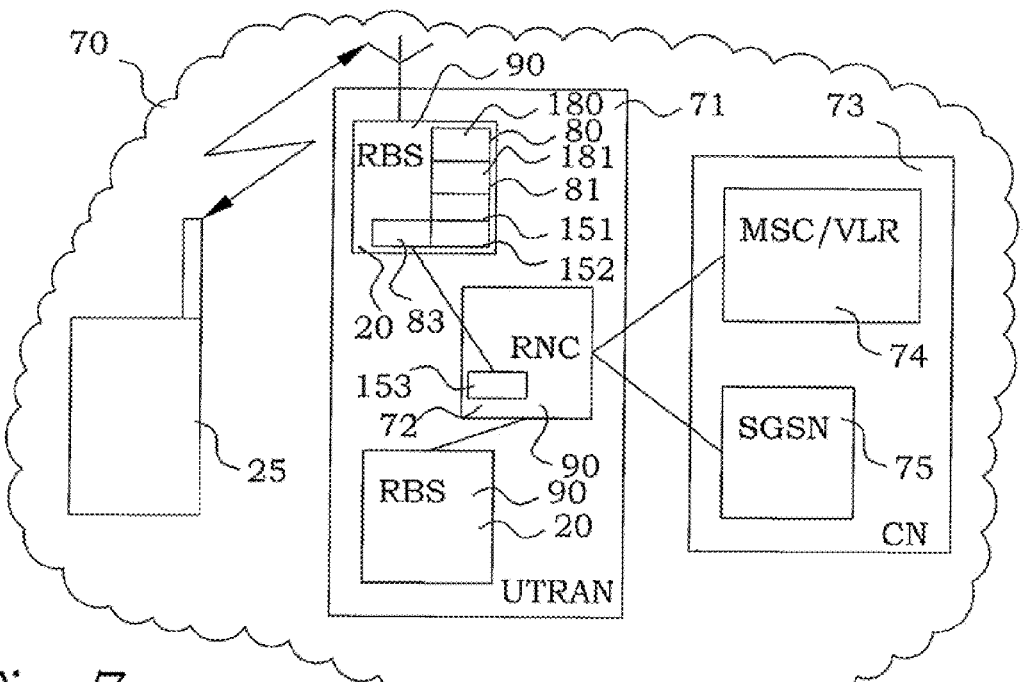
FIG. 7 is a block diagram of main parts of another embodiment of a system according to the present invention.

FIG. 7 illustrates another embodiment of a CDMA wireless communication system 70. Here, the RBS 20 does not comprise any means 153 for providing load reference data. Instead, a transmitter 83 is provided for transmitting the conditional probability distribution of a noise floor measure within the CDMA wireless communication system 70 to another node 90, in this case to the RNC 72. The RNC 72 comprises here the means 153 for providing load reference data, configured e.g. according to the third block 53 of FIG. 4. The transmitter 83 preferably also transmits the probability distribution of the RTWP to the RNC 72.

Figure 8:
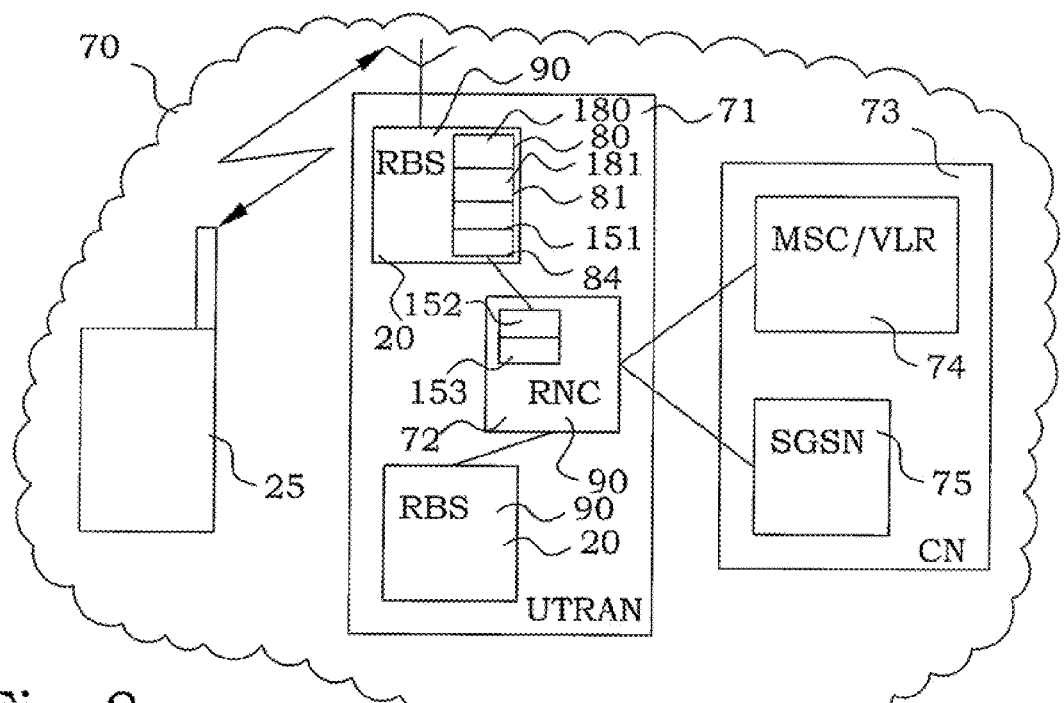
FIG. 8 is a block diagram of main parts of yet another embodiment of a system according to the present invention.

FIG. 8 illustrates yet another embodiment of a CDMA wireless communication system 70. Here, the RBS 20 does not comprise any means 152 for computing a conditional probability distribution of a noise floor measure. Instead, a transmitter 84 is provided for transmitting the probability distribution for a first power quantity within the CDMA wireless communication system 70 to another node 90, in this case to the RNC 72. The RNC 72 comprises here the means 152 for computing a conditional probability distribution of a noise floor measure, configured e.g. according to the second block 52 of FIG. 4. The transmitter 84 preferably also transmits the probability distribution of the RTWP to the RNC 72, for use in the means 153 for providing load reference data.

Figure 9:
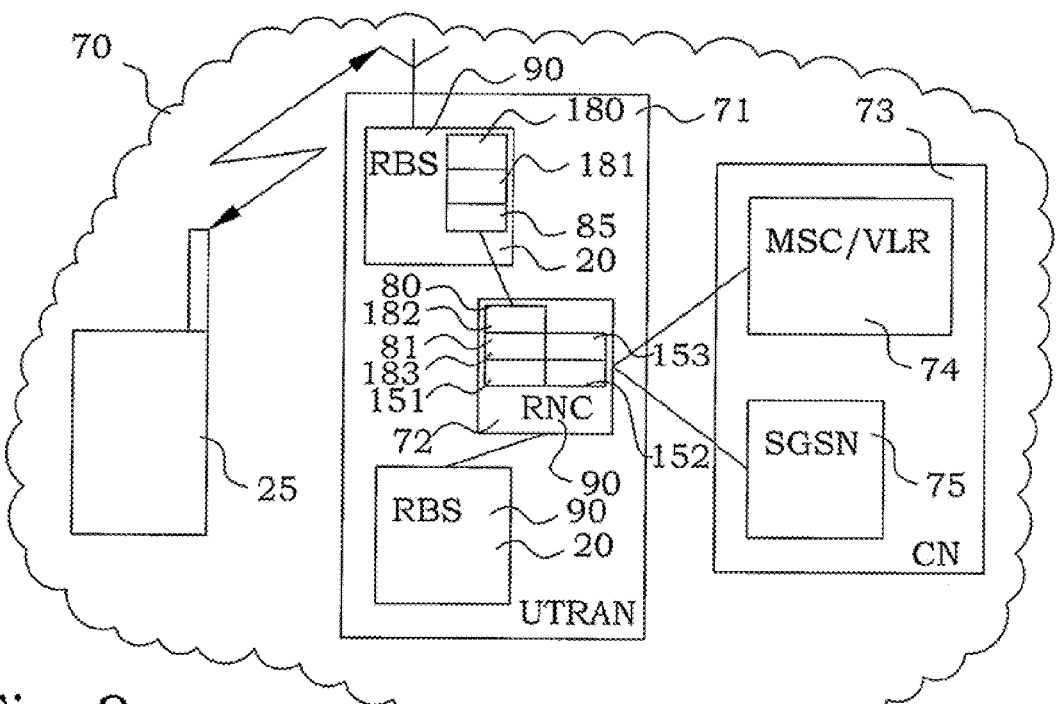
FIG. 9 is a block diagram of main parts of one more embodiment of a system according to the present invention.

FIG. 9 illustrates another embodiment of a CDMA wireless communication system 70, where the main load reference data activities are collected at the RNC 72. Here, the RBS 20 comprises the measuring means 180 of received total wideband power and well as the measuring means 181 of received scheduled enhanced uplink power. The RBS further comprises a transmitter 85 provided for transmitting quantities representing the received total wideband power and the received scheduled enhanced uplink power, e.g. according to the NBAP.

The RNC comprises means 80 for obtaining quantities representing measures of received total wideband power and means 81 for obtaining quantities representing measures of received scheduled enhanced uplink power. In the present embodiment, the means 80 for obtaining quantities representing measures of received total wideband power comprises a receiver 182 for quantities representing measures of received total wideband power. Likewise, the means 81 for obtaining quantities representing measures of received scheduled enhanced uplink power comprises a receiver 183 for quantities representing measures of received scheduled enhanced uplink power. The RNC further comprises means 151 for estimating a probability distribution for a first power quantity, e.g. according to the first block 51 of FIG. 4. The RNC 72 comprises also here the means 152 for computing a conditional probability distribution of a noise floor measure, configured e.g. according to the second block 52 of FIG. 4. Furthermore, the RNC 72 comprises also here the means 153 for providing load reference data, configured e.g. according to the third block 53 of FIG. 4. The load estimation is thereby based mainly in the RNC, and is perfectly suited to be used for admission control purposes.

There are many advantages with the invention. The accuracy of the soft noise floor estimation step is improved, leading to an enhanced accuracy of the complete soft noise rise estimation algorithm. The performance enhancement should pay off directly in terms of an enhanced capacity of any WCDMA system. The soft noise rise estimation algorithm for RNC admission control support becomes updated to maximize the use of the upgraded NBAP standard revision. Irrespective of the implementation, a large performance benefit is expected when the present RNC admission control function of the WCDMA RNC is replaced by a load based admission control algorithm, using the disclosed invention. In order to clarify the importance of this subject, performance simulations have been performed that compare the old admission control algorithm, based on radio link "counting", with a new RoT based algorithm, enabled by the present invention. The gain in terms of system capacity exceeds 20%. The gain results from a significantly reduced margin that is enabled by the new ability to actually measure or estimate the true WCDMA load, by applying the disclosed invention. The risk for an artificially high noise floor in highly loaded cells is removed. The high noise floor was associated with a risk for instability of the cell and consequently of neighbour cells. The soft load estimation can be used to estimate the load also after one or several receiver interference cancellation steps.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] WO 2006/076969
[2] 3GPP TS 25.433, UTRAN Iub Interface Node B Application Part (NBAP) Signalling, sections 8.2.8, 8.2.9, 9.1.21, 9.2.1.12, 9.2.2.39A and 9.2.1.53b, pp. 42-53, 203, 310-314, 412 and 360.
[3] 3GPP TS 25.133, Requirements for support of radio resource management, sections 9.2.1 and 9.2.18, pp. 86-87 and 99-100.
[4] T. Söderström, Discrete-time Stochastic Systems—Estimation and Control. Prentice Hall Int., 1994, chap. 9, pp. 233-267.

The invention claimed is:

1. Method for providing load reference data in a CDMA wireless communication system, comprising the steps of:
   measuring received total wideband power for a plurality of instances;
   measuring received scheduled enhanced uplink power for said plurality of instances;
   estimating a probability distribution for a first power quantity, being related to selected state variables of an estimation algorithm, from quantities representing said measured received total wideband power and quantities representing said measured received scheduled enhanced uplink power using selected measurement functions of said selected state variables of said estimation algorithm;
   said selected state variables correspond to cell power quantities;
   said selected measurement functions correspond to said quantities representing said measured received total wideband power and said quantities representing said measured received scheduled enhanced uplink power;
   computing a conditional probability distribution of a noise floor measure based on at least a number of said estimated probability distributions for said first power quantity; and
   providing load reference data based on said computed conditional probability distribution of said noise floor measure.

2. Method according to claim 1, wherein said first power quantity is a measure of the difference between received total wideband power and received scheduled enhanced uplink power.

3. Method according to claim 1, wherein said quantities representing said measured received scheduled enhanced uplink power are logarithmic quotients between said measured received scheduled enhanced uplink power and said measured received total wideband power.

4. Method according to claim 1, wherein said quantities representing said measured received scheduled enhanced uplink power are quotients between said measured received scheduled enhanced uplink power and said measured received total wideband power.

5. Method according to claim 1, wherein a first selected measurement function of said state variables of said selected measurement functions corresponds to a quotient between said received scheduled enhanced uplink power and said received total wideband power and a second selected measurement function of said state variables of said selected measurement functions corresponds to said received total wideband power.

6. Method according to claim 1, wherein a first selected measurement function of said state variables of said selected measurement functions corresponds to said received scheduled enhanced uplink power and a second selected measurement function of said state variables of said selected measurement functions corresponds to said received total wideband power.

7. Method according to claim 1, wherein a first selected state variable of said selected state variables corresponds to said received scheduled enhanced uplink power and a second selected state variable of said selected state variables corresponds to said received total wideband power.

8. Method according to claim 1, wherein a first selected state variable of said selected state variables corresponds to a first linear superposition of said received scheduled enhanced uplink power and said received total wideband power, and a second selected state variable of said selected state variables corresponds to a second linear superposition of said received scheduled enhanced uplink power and said received total wideband power, said first linear superposition and said second linear superposition being linearly independent.

9. Method according to claim 1, wherein said load reference data is a noise floor estimate, whereby said step of providing load reference data comprises calculating of a mean value of said conditional probability distribution of said noise floor measure as said noise floor estimate.

10. Method according to claim 1, wherein said load reference data is a noise rise measure, whereby said step of providing load reference data comprises calculating a soft noise rise measure, said soft noise rise measure being a conditional mean of a conditional probability distribution of a quotient of an estimated received total wideband power and said conditional probability distribution of said noise floor measure.

11. Method according to claim 1, further comprising:
   performing interference cancellation on received radio signals;
   whereby said step of measuring received total wideband power and said step of measuring received scheduled enhanced uplink power are performed after said step of performing interference cancellation.

12. Method for admission control in a CDMA wireless communication system, comprising the steps of:
   providing load reference data according to claim 1; and
   controlling admission based on said load reference data.

13. Node of a CDMA wireless communications system, comprising:
   means for obtaining quantities representing measures of received total wideband power for a plurality of instances;
   means for obtaining quantities representing measures of received scheduled enhanced uplink power for said plurality of instances; and
   means for estimating a probability distribution for a first power quantity from said quantities representing said measured received total wideband power and said quantities representing said measured received scheduled enhanced uplink power, said means for estimating being connected to said means for obtaining quantities representing measures of received total wideband power for a plurality of instances and said means for obtaining quantities representing measures of received scheduled enhanced uplink power for said plurality of instances;
   said means for estimating being arranged to operate with selected state variables corresponding to cell power quantities and with selected measurement functions of said state variables corresponding to said measured received total wideband power and quantities representing said measured received scheduled enhanced uplink power;

said first power quantity being related to said selected state variables;

whereby said means for estimating being arranged for estimating said probability distribution for said first power quantity using said selected measurement functions.

14. Node according to claim 13, further comprising means for computing a conditional probability distribution of a noise floor measure based on at least a number of said estimated probability distributions for said first power quantity, said means for computing being connected to said means for estimating.

15. Node according to claim 14, further comprising means for providing load reference data based on said computed conditional probability distribution of said noise floor measure, said means for providing load reference data being connected to said means for computing.

16. Node according to claim 15, further comprising transmitter for transmitting said load reference data within said CDMA wireless communication system.

17. Node according to claim 16, wherein said means for providing load reference data is arranged for providing a mean value of said computed conditional probability distribution of said noise floor measure as a noise floor value, and wherein said transmitter is arranged for transmitting a representation of said noise floor value and a representation of said received total wideband power within said CDMA wireless communication system.

18. Node according to claim 13, wherein said means for obtaining quantities representing measures of received total wideband power comprises measuring means of received total wideband power.

19. Node according to claim 13, wherein said means for obtaining quantities representing measures of received total wideband power for a plurality of instances comprises a receiver for quantities representing measures of received total wideband power.

20. Node according to claim 13, wherein said means for obtaining quantities representing measures of received scheduled enhanced uplink power comprises measuring means of received scheduled enhanced uplink power.

21. Node according to claim 13, wherein said means for obtaining quantities representing measures of received scheduled enhanced uplink power comprises a receiver for quantities representing measures of received scheduled enhanced uplink power.

22. Node according to claim 13, wherein said node is an RBS or an RNC.

* * * * *

UNITED STATES PATENT AND TRADEMARK OFFICE
CERTIFICATE OF CORRECTION

PATENT NO. : 7,953,025 B2
APPLICATION NO. : 12/525939
DATED : May 31, 2011
INVENTOR(S) : Wigren It is certified that error appears in the above-identified patent and that said Letters Patent is hereby corrected as shown below:

In Column 5, Line 17, delete "net" and insert -- not --, therefor.

In Column 7, Line 24, delete "ease" and insert -- case --, therefor.

In Column 7, Line 67, delete "(RSEPS)t))" and insert -- (RSEPS(t)) --, therefor.

In Column 10, Line 40, in Equation (14), delete "$E[e_{RSEPSPower}(t))]^2$" and insert -- $E[e_{RSEPSPower}(t)]^2$ --, therefor.

In Column 11, Line 10, after "Here" delete "and".

In Column 11, Line 38, in Equation (21), delete "x(x(t))+e(t)" and insert -- c(x(t))+e(t) --, therefor.

In Column 11, Lines 52-55, in Equation (25), delete "..." and insert -- ... --, therefor.

In Column 11, Lines 58-63, in Equation (25), delete "..." and

Signed and Sealed this
Thirteenth Day of March, 2012

David J. Kappos
*Director of the United States Patent and Trademark Office*

CERTIFICATE OF CORRECTION (continued)
U.S. Pat. No. 7,953,025 B2 insert -- $\left( \begin{matrix} \left( \frac{1}{RSEPS^{powermeasurement}} \right) & 0 \\ \left( \frac{-1}{RTWP^{powermeasurement}(t)} \right) & \left( \frac{1}{RTWP^{powermeasurement}(t)} \right) \end{matrix} \right)$ --, therefor.

In Column 13, Line 9, delete "(12)" and insert -- (12), --, therefor.

In Column 13, Line 33, delete "that" and insert -- that: --, therefor.

In Column 13, Line 37, delete "in" and insert -- in: --, therefor.

In Column 13, Line 55, delete "(37)(41)," and insert -- (37)-(41), --, therefor.

In Column 15, Line 28, delete "(t\t-T)" and insert -- (t | t-T) --, therefor.

In Column 16, Line 45, delete "were" and insert -- where --, therefor.

In Column 16, Lines 50-51, in Equation (57),
delete "-$\alpha_t x_{Residualdynamics}(t)$-...-$\alpha_s x_{ResidualDynamics}(t-(n-1)T)$," and
insert -- -$a_t x_{ResidualDynamics}(t)$-...-$a_s x_{ResidualDynamics}(t-(n-1)T)$, --, therefor.

In Column 17, Line 8, in Equation (61), delete "$x_{n+1, ResidualDynamics}(t+T)$" and
insert -- $x_{n-1, ResidualDynamics}(t+T)$ --, therefor.

In Column 17, Line 41, delete "iterations." and insert -- iterations: --, therefor.

In Column 17, Line 63, delete "t. C(t)" and insert -- t, C(t) --, therefor.

In Column 18, Line 62, delete "estimate." and insert -- estimated. --, therefor.

In Column 19, Line 22, delete "to ad." and insert -- load. --, therefor.

In Column 19, Line 44, delete "toad" and insert -- load --, therefor.

In Column 20, Line 20, delete "were" and insert -- where --, therefor.

In Column 20, Line 30, delete "COMA" and insert -- CDMA --, therefor.

In Column 21, Line 32, delete "RIBS" and insert -- RBS --, therefor.

In Column 21, Line 44, delete "measure," and insert -- measure --, therefor.